US006751952B2

(12) United States Patent
Chen

(10) Patent No.: US 6,751,952 B2
(45) Date of Patent: Jun. 22, 2004

(54) MUFFLING STRUCTURE FOR PNEUMATIC TOOL

(75) Inventor: Hsin-Chi Chen, Taichung Hsien (TW)

(73) Assignee: Tranmax Machinery Co., Ltd., Taichung Hsien (TW)

( * ) Notice: Subject to any disclaimer, the term of this patent is extended or adjusted under 35 U.S.C. 154(b) by 0 days.

(21) Appl. No.: 10/241,643

(22) Filed: Sep. 12, 2002

(65) Prior Publication Data

US 2004/0050041 A1 Mar. 18, 2004

(51) Int. Cl.[7] ........................................ F16D 31/02
(52) U.S. Cl. .................... 60/407; 173/DIG. 2; 181/230
(58) Field of Search ...................... 60/407; 173/DIG. 2; 181/230, 247, 252, 256

(56) References Cited

U.S. PATENT DOCUMENTS 4,205,732 A * 6/1980 Auerbach et al. ........... 181/230
4,258,798 A * 3/1981 Campbell et al. ........... 181/230
5,022,469 A * 6/1991 Westerberg ............ 173/DIG. 2
5,418,339 A * 5/1995 Bowen et al. ......... 173/DIG. 2
6,202,785 B1 * 3/2001 Hilling et al. .............. 181/230

* cited by examiner

*Primary Examiner*—Edward K. Look
*Assistant Examiner*—Michael Leslie
(74) *Attorney, Agent, or Firm*—Troxell Law Office PLLC

(57) ABSTRACT

Muffling structure for pneumatic tool, which is mounted at an opening of an exhaust end of gas exhaust passage of the pneumatic tool. The muffling structure includes a cock body having a body section. One end face of the body section is recessed to form a receptacle communicating with the gas exhaust passage of the pneumatic tool. At least one through hole is formed through a close end of the receptacle to the other end face of the body section to communicate the receptacle with outer side of the pneumatic tool. The muffling structure further includes at least one muffling fiber body plugged in the receptacle. The muffling fiber body is formed with multiple fine voids for the gas to pass through the muffling fiber body.

6 Claims, 7 Drawing Sheets

MUFFLING STRUCTURE FOR PNEUMATIC TOOL

BACKGROUND OF THE INVENTION

The present invention is related to a pneumatic tool, and more particularly to a muffling structure for pneumatic tool.

A muffler is mounted in a gas exhaust passage of a pneumatic tool for reducing the sonority produced by the high pressure gas quickly flowing through the passage. The muffler can be a muffling plate or socket having multiple perforations and made of copper by sintering. U.S. Pat. No. 5,878,568 discloses such a muffler. Another type of conventional muffler is made of nonmetal flexible muffling fiber. Such muffler is formed with a shape corresponding to the shape of the gas exhaust passage of the pneumatic tool and is embedded therein. Such muffler is able to slow down the exhaustion speed of the high pressure gas and reduce the noise. FIG. 1 shows such muffler.

Referring to FIG. 1, the muffling fiber 1 has numerous voids for the high pressure gas to pass therethrough. The voids are able to achieve muffling effect to a certain extent. However, such muffling fiber 1 still has some shortcomings in effect and manufacturing as follows:

1. The muffling fiber 1 is formed with a shape adapted to the gas exhaust passage 2. Generally, the muffling fiber 1 is cylindrical and has a considerable height. The muffling fiber 1 has an outer diameter slightly smaller than the inner diameter of the gas exhaust passage 2 for easily plugging the muffling fiber 1 into the passage 2. Accordingly, the muffling fiber 1 can hardly tightly contact with the inner face of the wall of the passage 2. When the high pressure gas goes from the interior of the pneumatic tool into the gas exhaust passage 2, the muffling fiber 1 can achieve muffling effect to a certain extent. However, a gap exists between the muffling fiber 1 and the wall of the passage 2. Therefore, the high pressure gas can go through the gap without muffling.
2. In order to achieve better muffling effect, the muffling fiber 1 must be enlarged to contact with the inner face of the wall of the passage 2 as tightly as possible. However, it will be harder to plug the muffling fiber 1 into the passage 2.
3. More importantly, the muffling fiber 1 occupies a room of the gas exhaust passage to achieve muffling effect. Accordingly, the high pressure gas going into the passage 2 will be interrupted and damped by the muffling fiber 1. As a result, the output torque of the pneumatic tool will be greatly reduced. This is also unsuitable for the driving structure of the pneumatic tool. In addition, the energy is wasted.

SUMMARY OF THE INVENTION

It is therefore a primary object of the present invention to provide a muffling structure for pneumatic tool, which not only is able to achieve best muffling effect, but also is able to minimize the negative affection on the output torque of the pneumatic tool.

It is a further object of the present invention to provide the above muffling structure for pneumatic tool, which has simple structure and is easy to manufacture and assemble.

According to the above objects, the muffling structure for pneumatic tool of the present invention is mounted at an opening of an exhaust end of gas exhaust passage of the pneumatic tool. The muffling structure includes a cock body having a body section. One end face of the body section is recessed to form a receptacle communicating with the gas exhaust passage of the pneumatic tool. At least one through hole is formed through a close end of the receptacle to the other end face of the body section to communicate the receptacle with outer side of the pneumatic tool. The muffling structure further includes at least one muffling fiber body plugged in the receptacle. The muffling fiber body is formed with multiple fine voids for the gas to pass through the muffling fiber body.

The present invention can be best understood through the following description and accompanying drawings wherein:

DETAILED DESCRIPTION OF THE PREFERRED EMBODIMENTS

Figure 1:
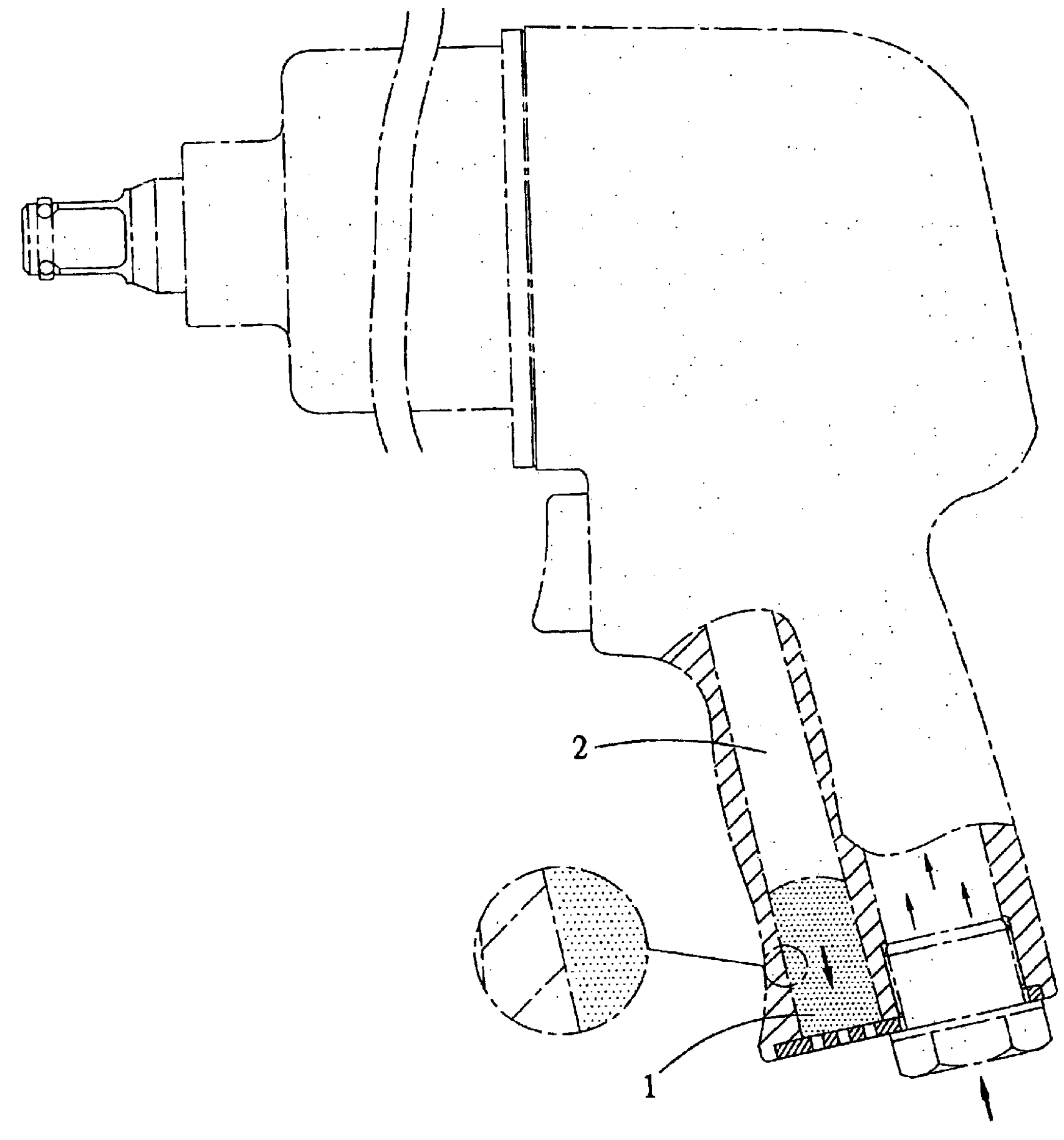
Fig. 1 PRIOR ART
FIG. 1 is a sectional view of a conventional muffling structure.
Figure 2:
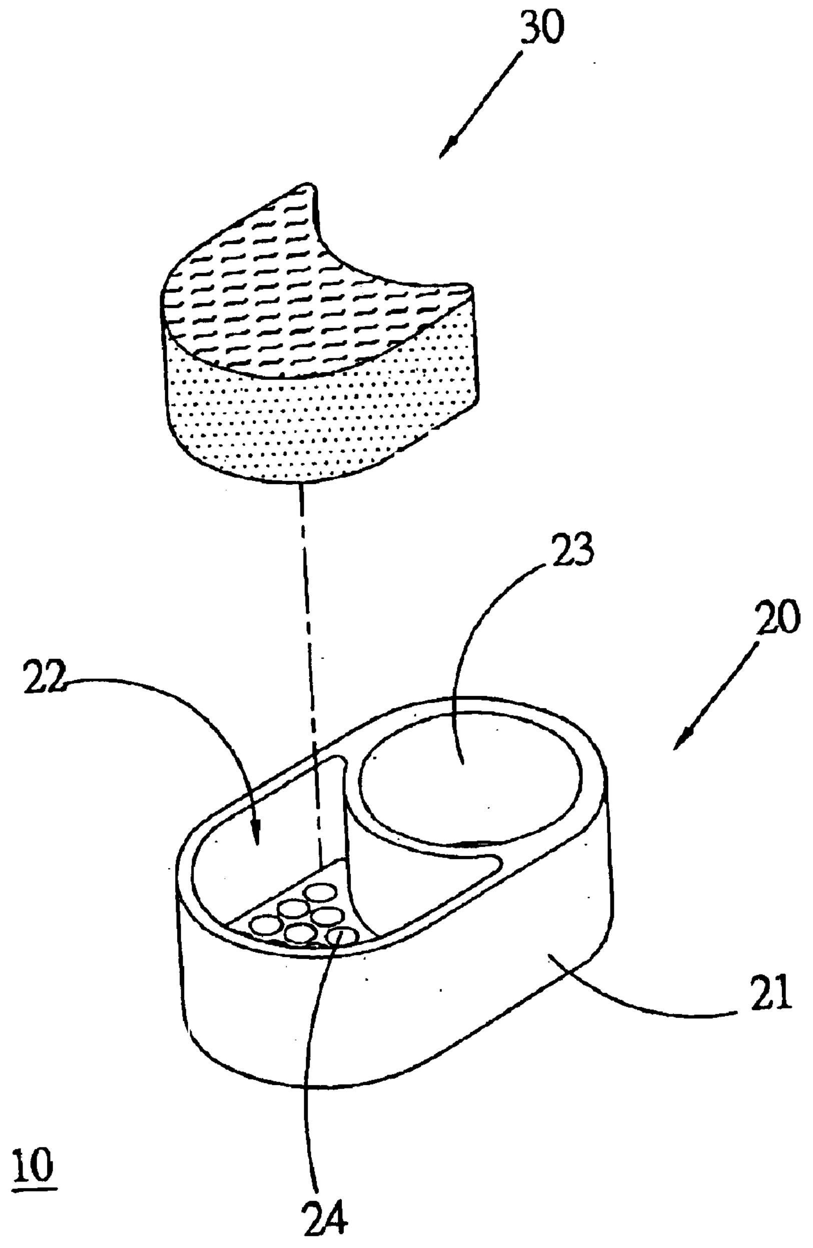
FIG. 2 is a perspective exploded view of a first embodiment of the present invention.
Figure 3:
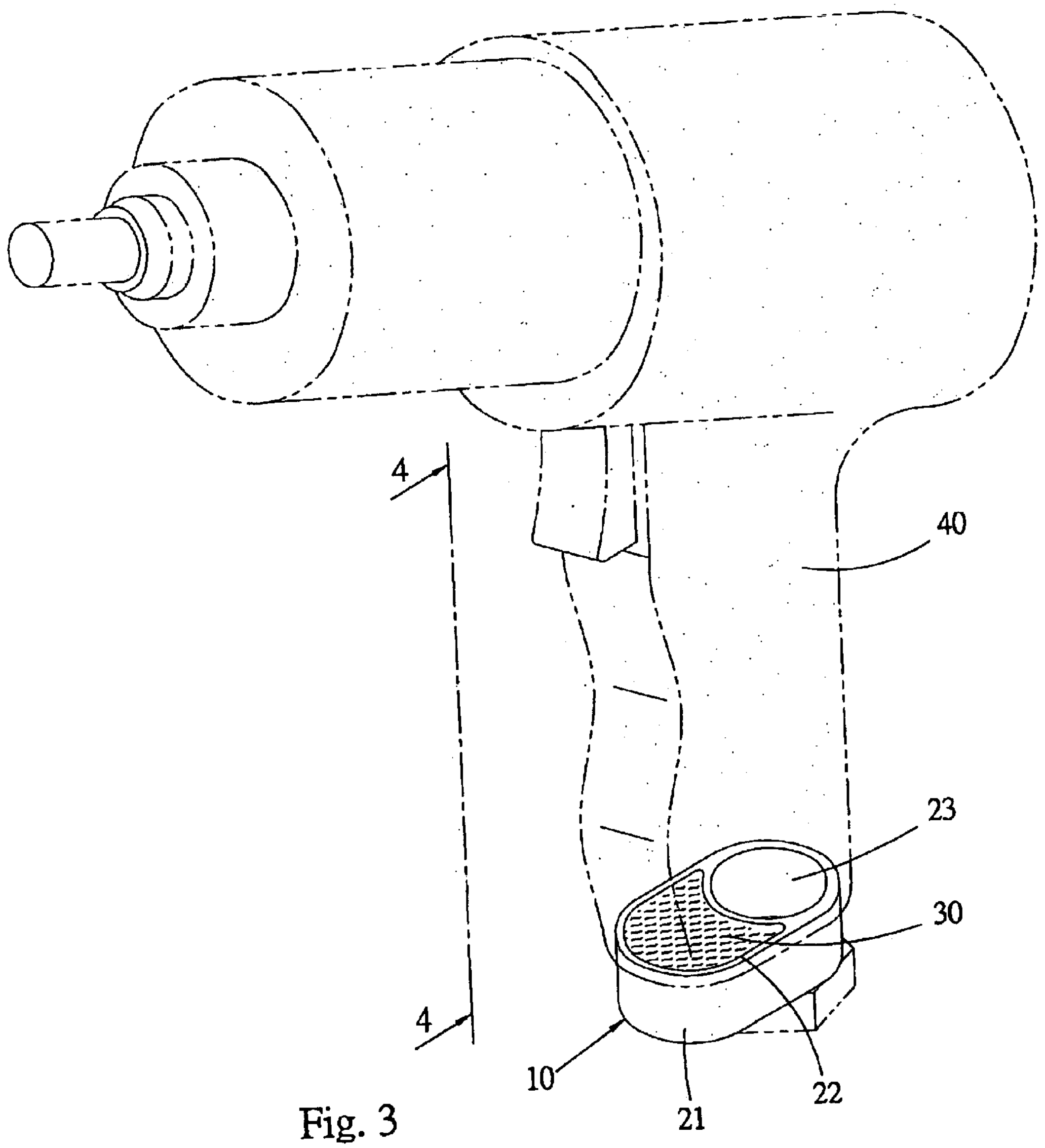
FIG. 3 is a perspective assembled view of the first embodiment of the present invention.
Figure 4:
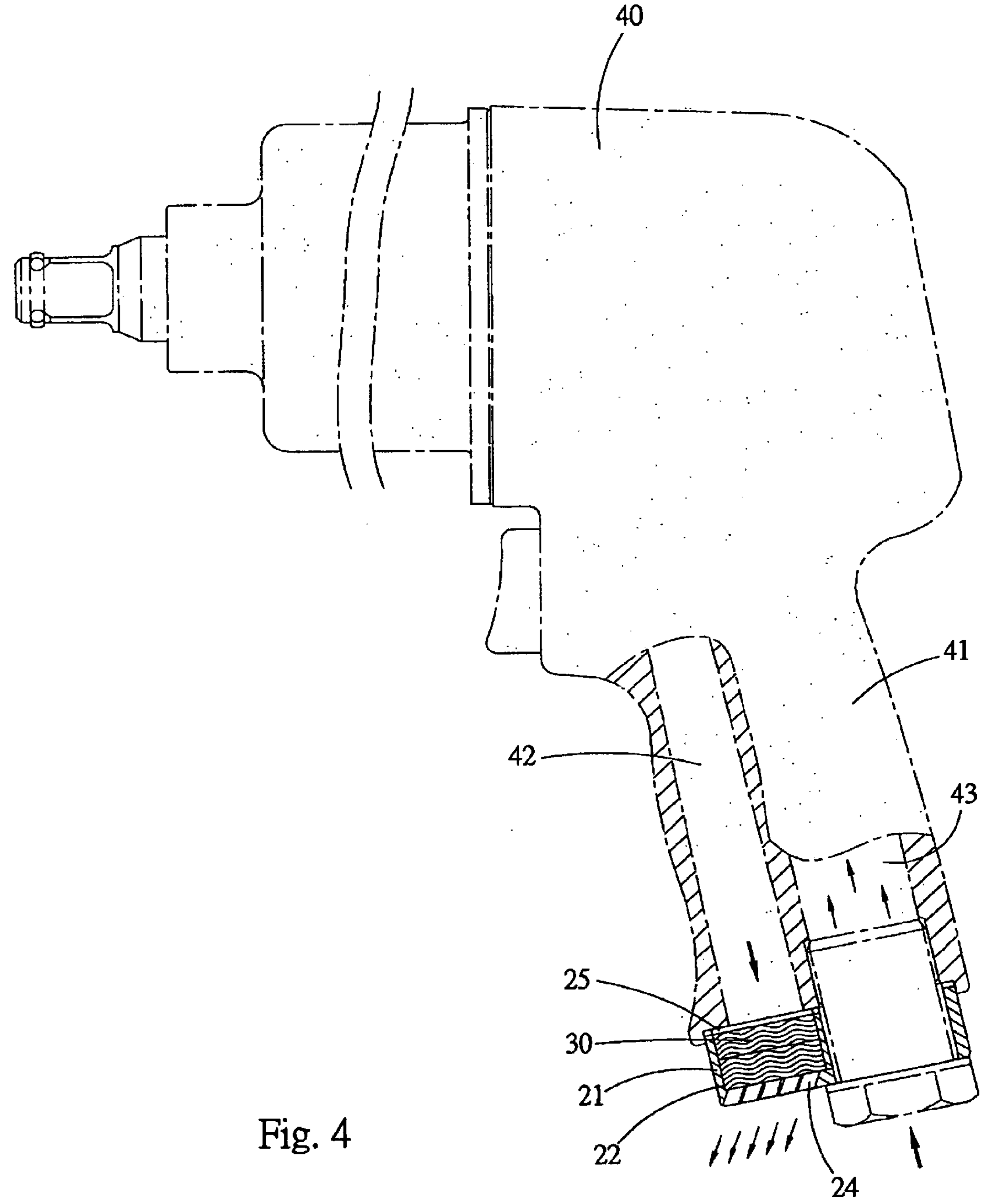
FIG. 4 is a sectional view taken along line 4—4 of FIG. 3.

Please refer to FIGS. 2 to 4. According to a preferred embodiment, the muffling structure 10 of the pneumatic tool of the present invention includes a cock body 20 and a muffling fiber body 30.

The cock body 20 has a body section 21 with a profile corresponding to that of bottom end of the handle 41 of the pneumatic tool 40. The body section 21 is recessed to form a receptacle 22 having a certain inner diameter. The receptacle 22 downward extends from a part of top face of the body section 21 by a certain depth. The inner diameter of the receptacle 22 is larger than the inner diameter of the internal gas exhaust passage 42 of the pneumatic tool 40. Beside the receptacle 22, the body section 21 is further formed with a fixing hole 23 passing through the body section 21 from top face to bottom face. The bottom of the receptacle 22 is formed with multiple vents 24 communicating the interior of the receptacle 22 with outer side of the body section 21. The diameter of the vent 24 is smaller than the inner diameter of the receptacle 22. The axis of the vent 24 and the bottom face of the body section 21 contain a certain angle. Accordingly, the vents 24 have inclined openings on the bottom face of the body section 21.

The muffling fiber body 30 is composed of multiple unit fibers and has a shape complementary to the shape of the receptacle 22. The thickness of the muffling fiber body 30 is smaller than the depth of the receptacle 22. When the muffling fiber body 30 is plugged into the receptacle 22, the periphery and one end of the muffling fiber body 30 abut against inner face of peripheral wall of the receptacle 22 and the close end of the receptacle 22. The other end of the muffling fiber body 30 is spaced from the open end of the receptacle by a certain distance to form a buffering space 25. Through the gaps between the unit fibers, the gas can flow through the muffling fiber body 30. When assembled, the multiple unit fibers can be directly placed into the receptacle 22 and compacted to a certain extent. Alternatively, the muffling fiber body 30 is previously formed with a shape complementary to the shape of the receptacle 22 and an outer diameter equal to the inner diameter of the receptacle 20. Therefore, the muffling fiber body 30 can be quickly and conveniently plugged into the receptacle 22.

In practical use, the muffling structure 10 composed of the cock body 20 and the muffling fiber body 30 is fixedly mounted at bottom end of the handle 41 of the pneumatic tool. The fixing hole 23 is coaxially positioned in the opening of the inlet passage 43 of the pneumatic tool 40. The open end of the receptacle 22 is coaxially positioned in the opening of the gas exhaust passage 42. Before the high pressure gas goes from the internal gas chamber of the pneumatic tool into the gas exhaust passage 42 and is exhausted through the vents 24, the muffling fiber body 30 provides a muffling effect to reduce the sonority of the noise during exhaustion.

Besides, it should be noted that the muffling structure 10 is specifically mounted at the end of the gas exhaust passage of the pneumatic tool. In comparison with the conventional device, the total space of the gas exhaust passage 42 is freed. Therefore, the gas exhaust passage 42 not only serves as the exhaust passage for the high pressure gas, but also forms proper buffering space. The receptacle 22 has larger inner diameter to form larger gas receiving space. In addition, a buffering space 25 is formed between the muffling fiber body 30 and the open end of the receptacle 22. Therefore, the resistance damping the gas when entering the muffling fiber body 30 is reduced. Moreover, the resistance in the gas exhaust passage 42 is also relieved to a certain extent. Accordingly, the resistance of the muffling fiber body 30 against the gas going from the internal gas chamber of the pneumatic tool into the gas exhaust passage is reduced. Therefore, the affection on the output torque of the pneumatic tool is reduced and a considerable muffling effect is still achieved.

In addition, in manufacturing and assembling, the muffling fiber body 30 is plugged into the open and relatively shallow receptacle 22. In contrast, in the conventional device, the muffling fiber body must be plugged into a deeper gas exhaust passage with smaller inner diameter. Therefore, the present invention can be more easily plugged into the gas exhaust passage. In addition, the outer diameter of the muffling fiber body 30 is larger than the inner diameter of the gas exhaust passage 42 and the muffling fiber body 30 is adapted to the receptacle 22 so that there is no gas through which the gas can directly pass. Therefore, the noise produced when the gas flows is reduced.

Figure 5:
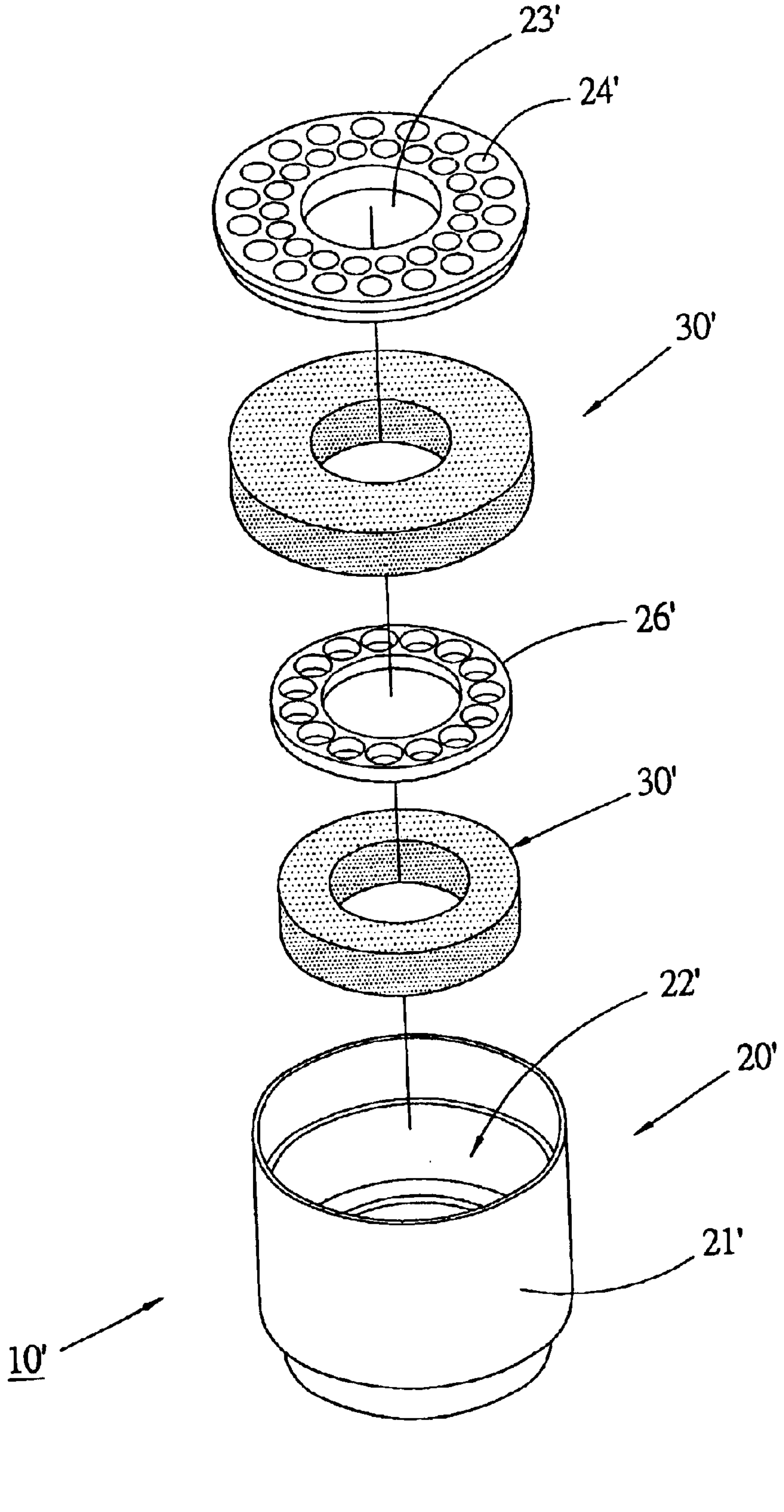
FIG. 5 is a perspective exploded view of a second embodiment of the present invention.
Figure 6:
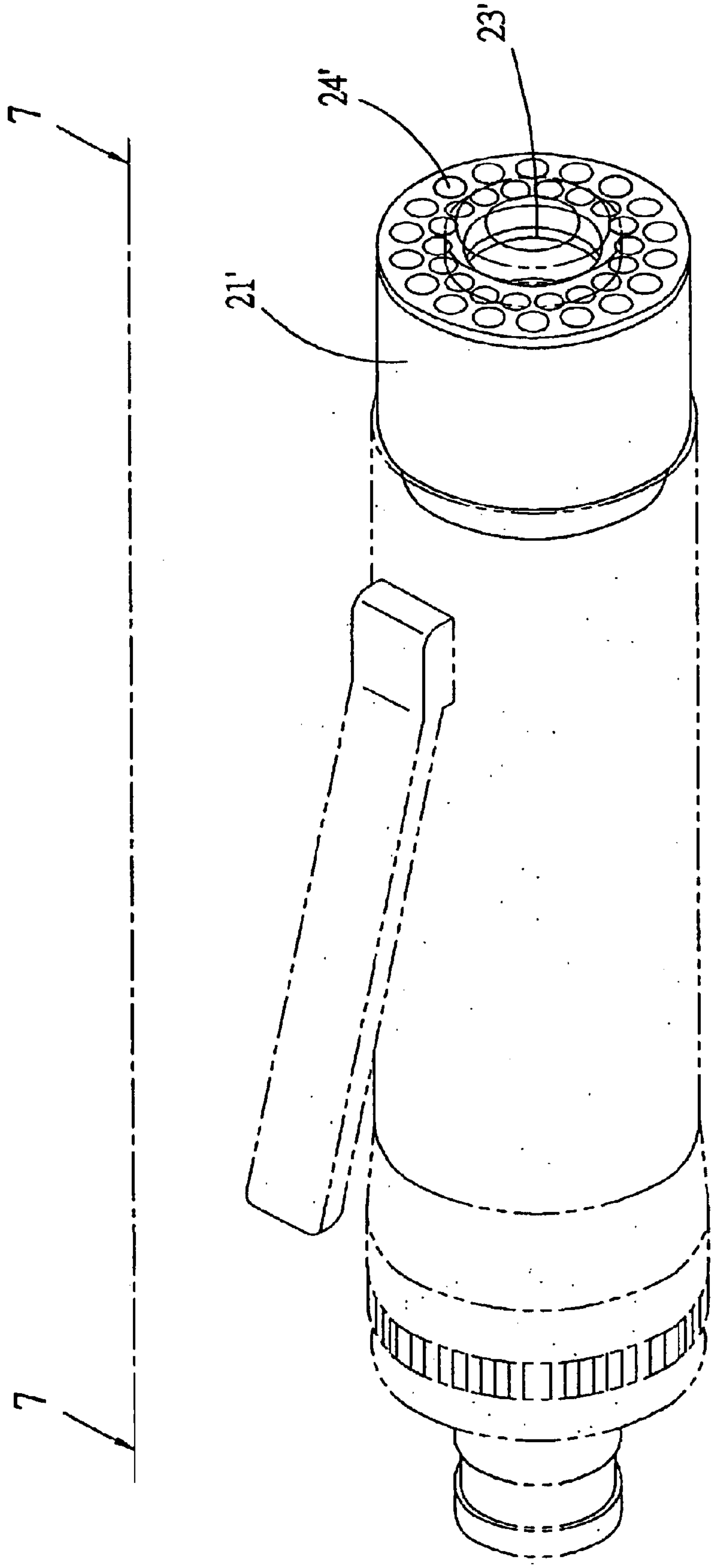
FIG. 6 is a perspective assembled view of the second embodiment of the present invention.
Figure 7:
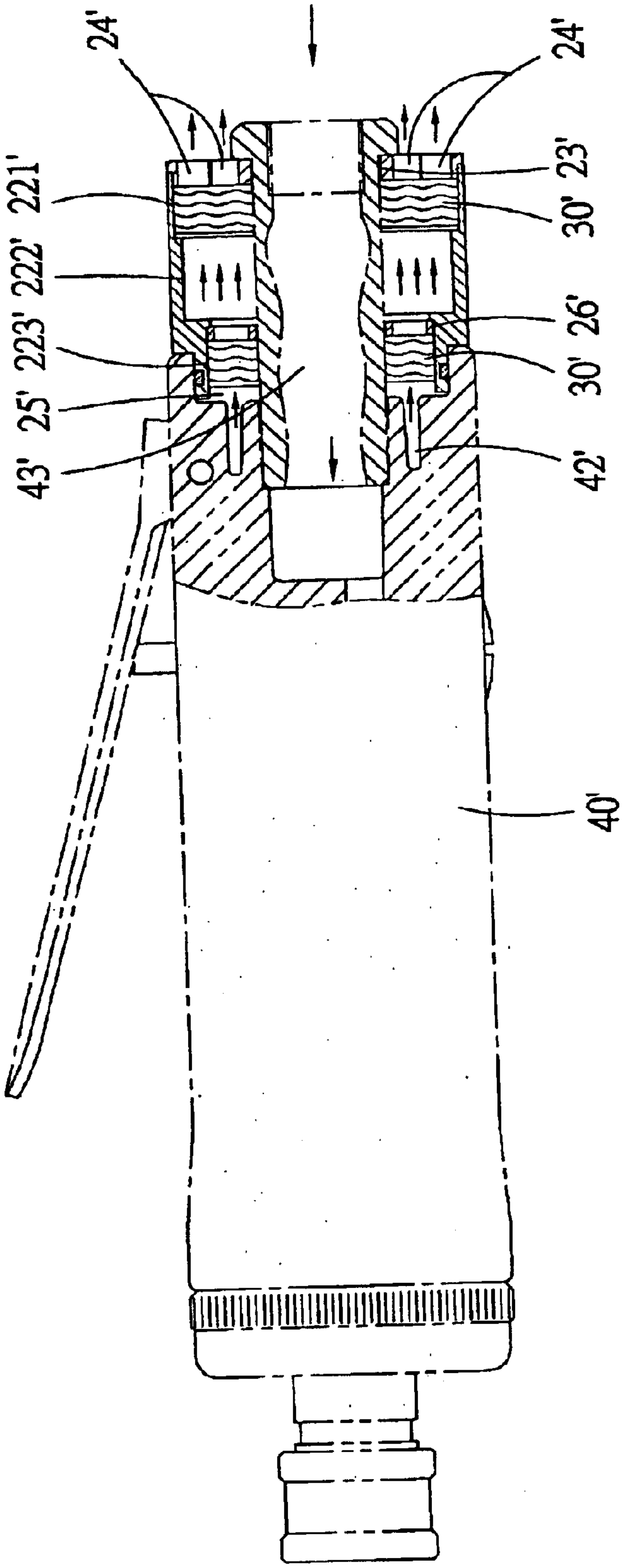
FIG. 7 is a sectional view taken along line 7—7 of FIG. 6.

FIGS. 5 to 7 show another embodiment of the present invention, in which the muffling structure 10' is composed of a cock body 20' and two muffling fiber bodies 30'. The cock body 20' has a cylindrical body section 21' and a receptacle 22' inward axially extending from the top end of the body section 21' by a certain depth to form a blind hole. A fixing hole 23' is axially formed through the bottom of the body section 21'. The diameter of fixing hole 23' is smaller than the inner diameter of the receptacle 22' to form an annular shoulder section. Multiple vents 24' are formed through the shoulder section to communicate the interior of the receptacle 22' with outer side of the body section 21'. An annular partitioning plate 26' having multiple perforations is coaxially disposed in the receptacle 22'.

The inner diameter of the receptacle 22' is axially sequentially divided into a first, a second and a third inner diameter sections 221', 222', 223' from the close end of the receptacle 22'. The inner diameter of the first section 221' is larger than the inner diameter of the second section 222'. The inner diameter of the third section 223' is smaller than the inner diameter of the second section 222' and larger than the inner diameter of the gas exhaust passage 42' of the pneumatic tool 40'. The partitioning plate 25' is coaxially fixed on a corresponding section of the third section 223' adjacent to the second section 222'.

The muffling fiber bodies 30' are formed as an annular plate bodies the outer diameters of which are respectively equal to the inner diameters of the first and third inner diameter sections 221', 223'. The outer diameters are both larger than the inner diameter of the gas exhaust passage 42'. The muffling fiber bodies 30' are coaxially plugged in the first and third sections 221', 223' and restricted and located by the close end of the receptacle 22' and the partitioning plate 26'. The periphery of the muffling fiber body 30' positioned in the third section 223' tightly abuts against the inner face of the wall of the third section 223'. The end of the muffling fiber body 30' is spaced from the open end of the third section 223', that is, the open end of the receptacle 22' by a certain distance to form a buffering space 25'.

The muffling structure 10' is mounted at the exhaust end of the gas exhaust passage of the pneumatic tool. Referring to FIG. 6, the cock body 20' is fixed on a corresponding section of the pneumatic tool with the opening of the receptacle 22' facing the open end of the gas exhaust passage 42'. The fixing hole 23' and the space of the receptacle 22' corresponding to the range of the fixing hole 23' form a space for the component of the inlet passage 43' to pass therethrough. In other words, the gas exhaust passage 42' of the pneumatic tool to which this embodiment is applied is annular. This embodiment provides an annular passage communicating with the gas exhaust passage 42'. Such pattern of pneumatic tool pertains to a conventional pneumatic tool with back gas exhaust system.

When the high pressure gas goes from the interior of the pneumatic tool 40' through the gas exhaust passage 42' into the muffling structure 10', the gas first enters the buffering space 25' and the flowing speed of the high pressure gas is slowed down. After passing through the muffling fiber body 30' in the third section 223', the gas enters the second section 222' with larger-inner diameter. By means of the larger flowing cross-sectional area, the flowing speed of the gas is further slowed down. Then, the gas flows through the muffling fiber body 30' in the first section 221' and the vents 24' and escapes to outer side of the pneumatic tool 40'.

According to the above structure, in addition to the muffling fiber bodies 30 for reducing sonority, the buffering space 25' and the second inner diameter section 222' provide buffering effect for further slowing down the flowing speed of the gas and buffering the resistance of the muffling fiber bodies 30 against the flowing gas. Therefore, the negative affection of the muffling structure 10' on the output torque of the pneumatic tool is avoided. Moreover, the flowing cross-sectional area of the muffling structure 10' is enlarged stage by stage in cooperation with multiple muffling fiber bodies 30', the muffling effect is greatly enhanced and the affection on the torque is greatly reduced.

The above embodiments are only used to illustrate the present invention, not intended to limit the scope thereof. Many modifications of the above embodiments can be made without departing from the spirit of the present invention.

What is claimed is:

1. A muffling structure for a pneumatic tool, which is mounted at an opening of an exhaust end of gas exhaust passage of the pneumatic tool, comprising:

a cock body having a body section, one end face of the body section being recessed to form a receptacle communicating with the gas exhaust passage of the pneumatic tool, at least one through hole being formed through a closed end of the receptacle to the other end face of the body section to communicate the receptacle with outer side of the pneumatic tool; and at least one muffling fiber body plugged in the receptacle, the muffling fiber body being formed with multiple fine voids for the gas to pass through the muffling fiber body, wherein the receptacle is axially sequentially divided into a first, a second and a third inner diameter sections from the closed end of the receptacle, the muffling structure further comprising two muffling fiber bodies respectively plugged in the first and third inner diameter sections.

2. The muffling structure for a pneumatic tool as claimed in claim 1, wherein the inner diameter of the first inner diameter section is larger than the inner diameter of the second inner diameter section, while the inner diameter of the second inner diameter section is larger than the inner diameter of the third inner diameter section.

3. The muffling structure for a pneumatic tool as claimed in claim 1, wherein the third inner diameter section has a predetermined inner diameter larger than the inner diameter of the gas exhaust passage of the pneumatic tool.

4. The muffling structure for a pneumatic tool as claimed in claim 1, wherein the cock body further includes a partitioning plate having multiple perforations, the partitioning plate being disposed on a corresponding section of the third inner diameter section adjacent to the second inner diameter section for locating the muffling fiber body plugged in the third inner diameter section.

5. The muffling structure for a pneumatic tool as claimed in claim 1, wherein the periphery of the muffling fiber body plugged in the third inner diameter section tightly abuts against the inner face of the wall of the third inner diameter section, while one end of the muffling fiber body is spaced from the open end of the third inner diameter section by a predetermined distance.

6. The muffling structure for a pneumatic tool as claimed in claim 2, wherein the third inner diameter section has a predetermined inner diameter larger than the inner diameter of the gas exhaust passage of the pneumatic tool.

* * * * *